(12) United States Patent
Calvez

(10) Patent No.: US 6,658,101 B1
(45) Date of Patent: Dec. 2, 2003

(54) INTERFACE DEVICE FOR COMMUNICATION BETWEEN AN EXTERNAL NETWORK SUBSCRIBER'S TERMINAL INSTALLATION AND AN INTERNAL NETWORK

(75) Inventor: Serge Calvez, Saint Martin des Champs (FR)

(73) Assignee: France Telecom, Paris (FR)

(*) Notice: Subject to any disclaimer, the term of this patent is extended or adjusted under 35 U.S.C. 154(b) by 0 days.

(21) Appl. No.: 09/462,572
(22) PCT Filed: Jul. 10, 1998
(86) PCT No.: PCT/FR98/01510
§ 371 (c)(1),
(2), (4) Date: Feb. 22, 2000
(87) PCT Pub. No.: WO99/03229
PCT Pub. Date: Jan. 21, 1999

(51) Int. Cl.[7] ................................................. H04M 3/42
(52) U.S. Cl. ................................................... 379/201.01
(58) Field of Search ....................... 379/201.01, 207.01

(56) References Cited

U.S. PATENT DOCUMENTS 5,857,087 A * 1/1999 Bemanian et al. .......... 395/309

FOREIGN PATENT DOCUMENTS

EP 0 639 019 A1 7/1994

OTHER PUBLICATIONS

WO 97/09800.
WO 97/19538.
Babich F: "Home Network Requirements. The Esprit HS Proposal", European Transactions on Telecommunications and Related Technologies, vol. 5, No. 1, 1 janvier 1994, pp. 93–106, XP000445720.

* cited by examiner

Primary Examiner—Creighton Smith
(74) Attorney, Agent, or Firm—Pearne & Gordon LLP

(57) ABSTRACT

The present invention concerns an interface and switching device for communication between a subscriber terminal installation (11) of an external network and an internal network (12), to which several physical entities (15, 16, 17) are connected, comprising:

- a first transmission-reception interface module connected to the said terminal installation (11);
- a second transmission-reception interface module connected to the internal network;
- several detection modules each fulfilling a function of detecting an action of putting in communication one of the said entities on the external network;
- a processing module, connected to at least one memory module, which manages the overall operation of the said device so as to permit an ordered management of the said subscriber terminal installation (11).

11 Claims, 3 Drawing Sheets

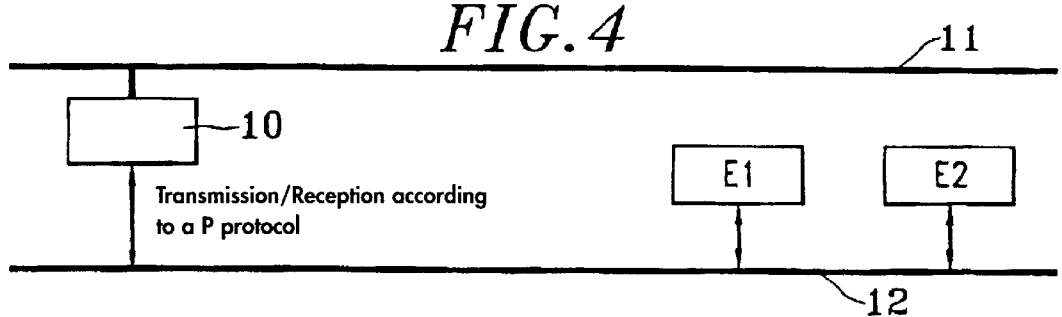
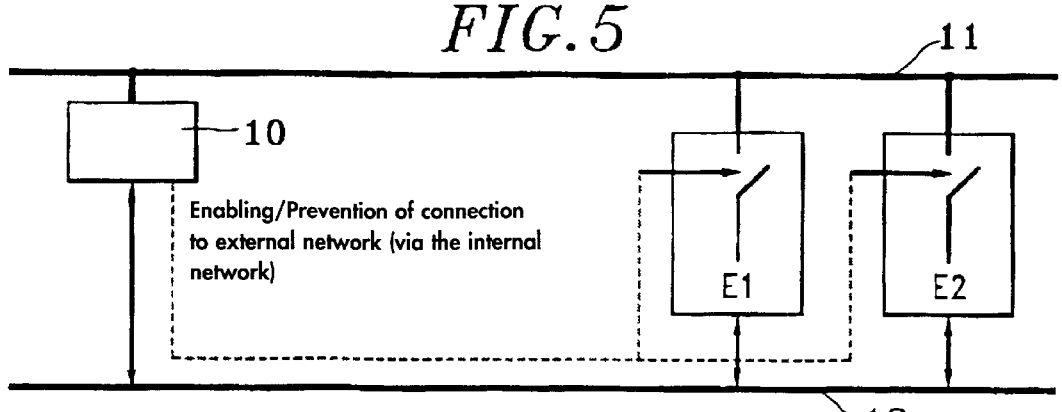
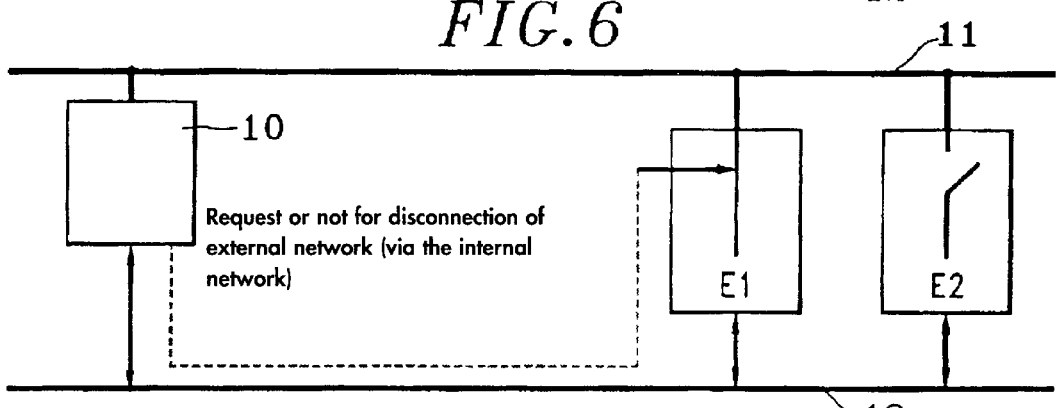
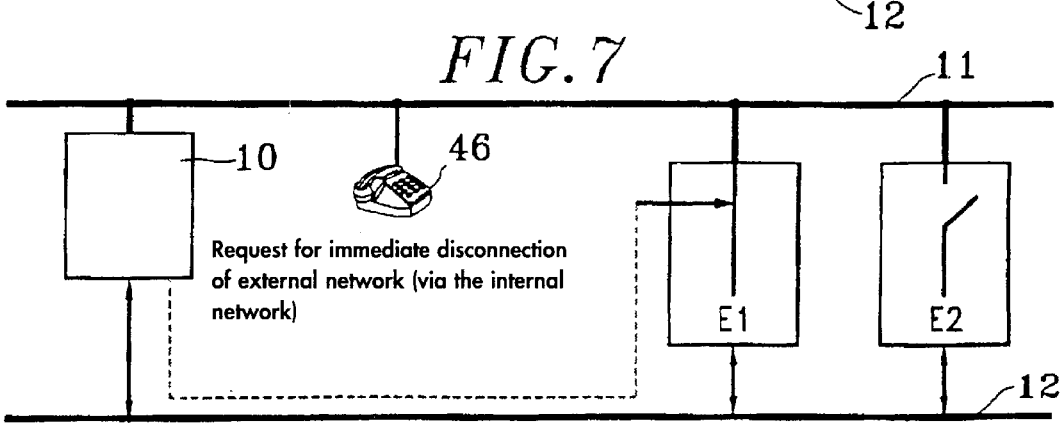

INTERFACE DEVICE FOR COMMUNICATION BETWEEN AN EXTERNAL NETWORK SUBSCRIBER'S TERMINAL INSTALLATION AND AN INTERNAL NETWORK

FIELD OF THE INVENTION

The present invention concerns a network interface and switching device for communication between a subscriber terminal installation of an external network, such as a switch telephone network, and an internal network, such as a home network.

PRIOR ART

In the context of the development of telecommunications, the multiplication of equipment and functions available with regard to terminal installations leads to a demand for an increase in the possibilities of access to the telecommunication network, which makes the functioning of these installations more and more complex, or even unmanageable.

For several years, the developments in equipment, making it possible to manage or act at a distance via a network supporting data exchanges, has enabled a multiplicity of applications to be foreseen.

The major drawback of such a multiplication of applications is an increased risk of repeated malfunctionings because of the lack of coherence in the installations and the fact that there is no global management thereof.

It is therefore necessary to be able to control such a potential proliferation and thus preserve the prime capacities of the telecommunication network.

The object of the invention is to resolve these different problems.

DISCLOSURE OF THE INVENTION

The present invention concerns an interface and switching device for communication between a subscriber terminal installation of an external network and an internal network, to which several physical entities are connected, comprising:
  a first interface module for the transmission and reception of digital data or analogue signals, connected to the said terminal installation;
  a second interface module for the transmission and reception of digital data or analogue signals, connected to the internal network;
  a processing module, connected to at least one memory module, which manages the overall operation of the said device so as to provide a function of master of the said subscriber terminal installation by supervising both the state of availability of the external network and the state of the internal network from and to which requests and acknowledgements can amongst other things be exchanged, a physical entity being connected only on authorisation from this processing module:
    directly to the external network,
    or via this processing module,
this taking place after management of the priorities by this processor module;
characterised in that it comprises:
  several detection modules each providing a function of detecting an action of putting in communication one of the said entities on the external network:
    a first module providing the line busy detection function,
    a second module providing the function of parallel handset off-hook detection,
    a third module providing the function of busy tone detection,
    a fourth module providing the function of call waiting indication detection;
  these detection modules communicating and exchanging data with the processing module;
  a module for managing the protocol on the internal network which is associated with the second transmission-reception interface module, the processing module being connected via input-output ports to a data exchange bus for communicating with this module;
  an input-output buffer circuit connected to the processing module so as to permit the connection of a man-machine interface module.

Advantageously, the device of the invention comprises a module fulfilling the modem function, connected to the first interface module, to the fourth detection module and to the processing module, and making it possible notably to decode V23 information on an incoming call and, where necessary, to immediately off-hook and thus initiate the appropriate switching to one of the physical entities.

Advantageously, the processing module is connected to at least one program memory module and to at least one random access module making it possible to store information peculiar to the internal network and/or information peculiar to the external network, information which may notably be downloaded and updated via the external network.

Advantageously, the module for managing the protocol on the internal network makes it possible to manage the different requests issuing from the internal network in accordance with particular priorities.

Advantageously, the device of the invention comprises software or physical means for managing possible conflicts between incoming calls issuing from the external network and requests to establish communication to the outside, means making it possible to be self-powered, remotely powered or powered by another entity in the internal network, and means making it possible to be configured and supervised via a man-machine interface, either attached or detached.

The external network can be the switched telephone network (STN), which, in this case, can offer services of differentiated ringing, presentation of V23 messages in call phase with a particular "type" field, such as a remote home automation call (type 0×88), such as the presentation of the number of the caller (0×80), the presentation of the name (or identity) of the person (or calling entity) (0×80) and other services of direct selection on arrival on which notably the switching function of the invention is based.

The external network can also be taken from amongst the following networks: integrated services digital network (ISDN), ATM (asynchronous transfer mode) network, xDSL (digital subscriber loop) network, GSM network, DECT network, DCS1800 network or UMTS (universal mobile telecommunications system) network.

The internal network can be a carrier current, twisted pair, optical fibre or radio network (CT0, CT2, DECT, GSM, DCS1800, PHS, UMTS, UHF etc).

The protocol for access to the internal network can be of the EHS (ESPRIT Home System), EIBus, PLAN or ITD (home-automation telecomms interface (Club Périnuméris)) type.

BRIEF DESCRIPTION OF THE FIGURES

FIGS. 4 to 7 illustrate the functioning of the device of the invention.

DETAILED DESCRIPTION OF EMBODIMENTS

Figure 1:
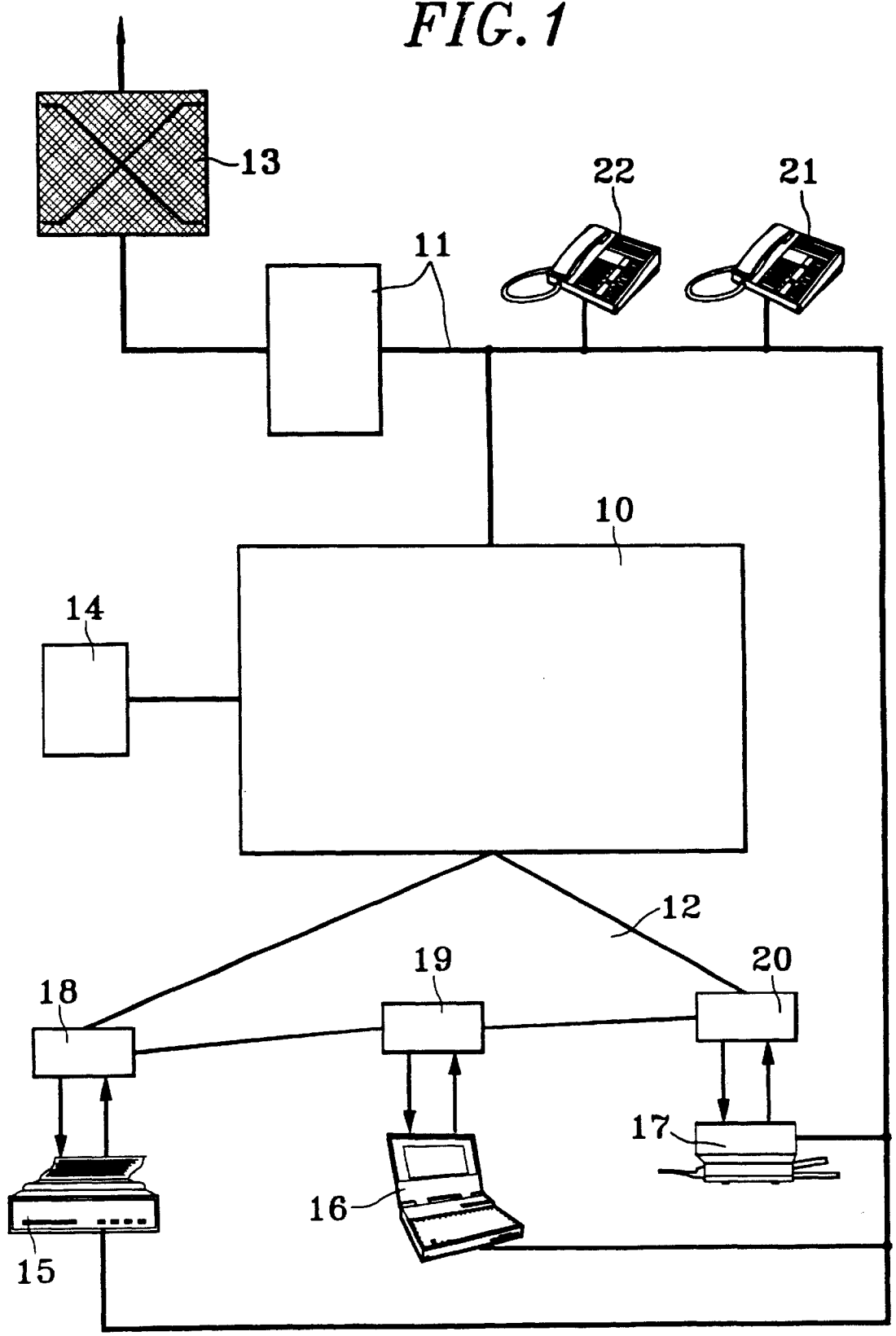
FIGS. 1 to 3 illustrate the device of the invention.
Figure 2:
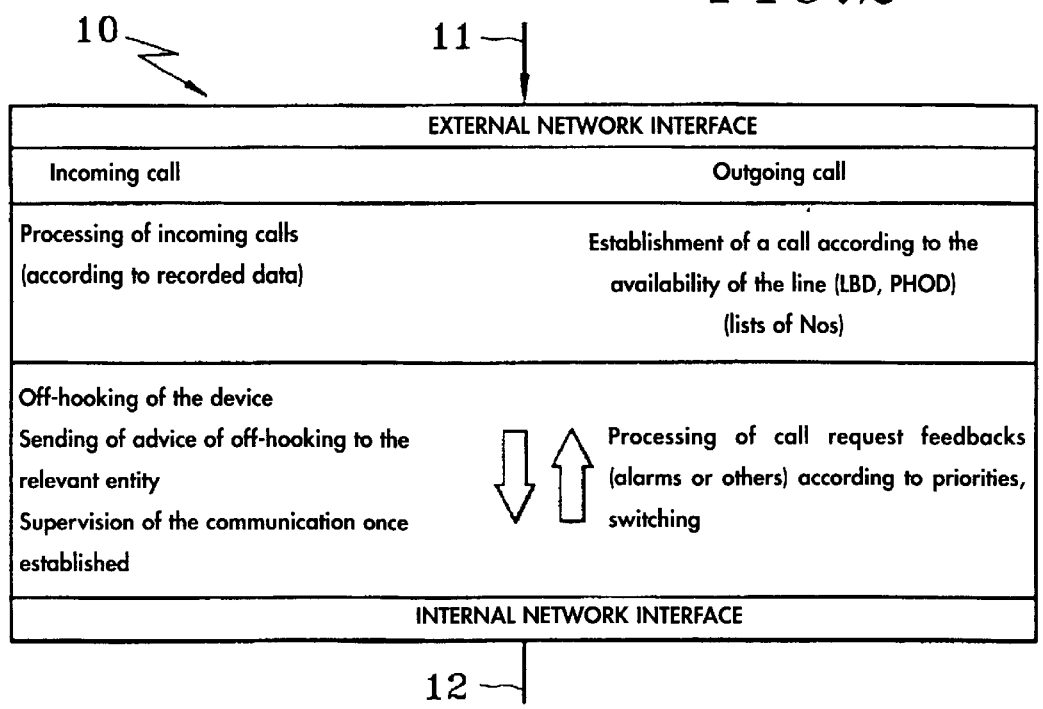

As illustrated in FIGS. 1 and 2, the communication device 10 according to the invention for fulfilling an interface function between a subscriber terminal installation 11 of an external network and an internal network 12 comprises on the one hand an interface for connection to the external network, which can be the switched telephone network, and on the other hand an interface for connection to the internal network.

FIG. 1 also depicts a switch 13, a man-machine interface module (MMI) 14, different appliances or entities 15, 16, 17 disposed between the subscriber terminal installation 11 and a connector giving access to the internal network (18, 19, 20). These entities can be, for example: a facsimile machine 15, a microcomputer 16 or a printer 17. Two telephone sets 21 and 22 are also connected to the subscriber terminal installation 11.

FIG. 2 illustrates the different functions of the device of the invention.

The device of the invention allows the ordered management of a telecommunication terminal installation in an external network. For this purpose, it is on the one hand connected to this external network and has available, on the other hand, a module allowing access to the internal network, which can for example be an electrical system in a dwelling, on which it is capable of sending or receiving data in accordance with a previously defined protocol, coming from other physical entities Ei (here E1 and E2) connected to this same internal network, as illustrated in FIG. 4. These other entities can have requirements for telecommunications via the external network.

The device of the invention comprises software means (priority, cyclic, random etc choices) or physical means (switch, power supply cutoff etc) for managing possible conflicts between incoming calls issuing from the external network and requests to establish communication to the outside.

The device of the invention makes it possible to fulfil a master function by supervising both the state of the line of the external network and the state of the internal network, from and to which requests and acknowledgements can, amongst other things, be exchanged. The entities Ei connected to the internal network therefore have access to the external network. This access is under the control and authorisation of the device of the invention, which manages the different priorities. In idle mode, vis-à-vis an exchange on the external network, the entities Ei are disconnected, as illustrated in FIG. 4. On prior request from one of them or when there is an incoming call intended for one of them, the device of the invention manages all the actions of putting in incoming or outgoing communication. Any entity Ei is connected to the external network only on authorisation of the device of the invention.

Figure 3:
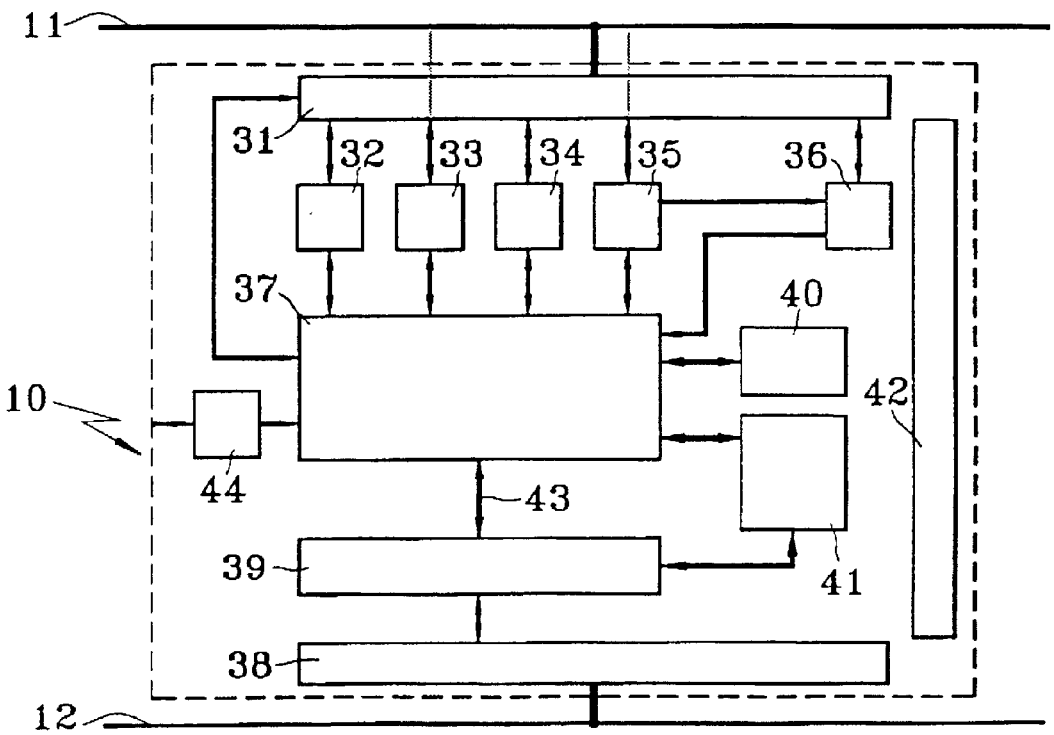

One embodiment of the device of the invention is illustrated in FIG. 3.

A first module 31 makes it s possible to manage the problems of interface in reception and transmission of digital data or analogue signals (for example voice) on the external network side. This module 31 can have, amongst other things, as is well known to persons skilled in the art, a transmission circuit, a diode bridge, a DTMF (dual tone multifrequency) dialing circuit, and an off-hooking device.

Through this module 31 there pass (in on-hook and off-hook mode) the information issuing from the external network (such as V23 frames) or the elements useful to the different detection modules 32, 33, 34, 35 and 36 (such as the voltage levels, or specific frequencies).

These detection modules are:

a module 32 fulfilling the line busy detection [LBD] function, where one of the principles used can be the comparison of line voltage with an idle reference voltage, a voltage which is stored in memory;

a module 33 fulfilling the parallel handset off-hook detection [PHOD] function, where one of the principles used can be the comparison of the line voltage with a reference voltage stored in memory, this in on-hook mode vis-à-vis the device of the invention, whilst an entity Ei is currently in communication and is therefore off-hook;

a module 34 fulfilling the busy tone detection [BTD] function, one embodiment of which may be a filter for detecting the frequency 440 Hz in off-hook mode vis-à-vis the device of the invention;

a module 35 fulfilling the call-waiting indication detection [CWID] function, one embodiment of which can be a filter for detecting the steady frequency 440 Hz in off-hook mode vis-à-vis the device of the invention, whilst an entity is in the course of communication and is therefore off-hook;

a module 36 which fulfils the V23 modem function and can therefore be acted on directly by the module 31 or via the module 35 on reception of a V23 message after indication of call waiting. This module 36 makes it possible notably to decode V23 information when there is an incoming call (presentation of the number of the caller on STN, type of particular messages such as 0×80, 0×82, 0×88 etc) and, where applicable (for example when the number of the caller is present in a list of possible numbers), to immediately off-hook (i.e. before the first ringing tones on STN (and thus to initiate the appropriate switching to one of the physical entities 15, 16, 17; "switching" meaning here "addressing and then connecting the communication" to the entity concerned or "simply addressing" the entity concerned and asking it to connect itself directly to the external network.

All these modules 31 to 36 communicate and exchange data with a processing module 37 which fulfils the function of microcontroller and consequently manages the overall functioning of the system so as to provide a function of master of the said subscriber terminal installation 11 by supervising both the state of availability of the external network and the state of the internal network from and to which requests and acknowledgements can amongst other things be exchanged. A physical entity 15, 16, 17 being connected only on authorisation of this processing module 37:

directly to the external network ("parallel" supervision of the communication established, interruption only possible by command via the internal network), or via this processing module 37 ("serial" supervision of the communication established, interruption possible by rupture of data exchanges on the bus 43 or by command via the internal network), this taking place after management of the priorities by this processing module.

This module 37 has a module 40 which represents the program memory of the device (ROM).

It also has a module 41 which is a random access memory (RAM) or buffers necessary for managing conflicts or stacks.

The processing module 37 is thus connected to at least one program memory module 40 and to at least one random access memory module 41 making it possible to store information peculiar to the internal network and/or information peculiar to the external network, information which can notably be downloaded and updated via the external network.

This module 37 is connected via input/output ports to a data exchange bus 43 for communicating with a module 39 which represents the entity for managing the protocol on the internal network, an entity which can also be a microcontroller equipped with suitable peripherals. This module 39 is associated with the transmission/reception interface 38 for digital data or analogue signals (for example voice) connected to the internal network 12.

The module 39 for managing the protocol on the internal network makes it possible to manage the different requests issuing from the internal network in accordance with particular priorities (a protocol having to have a level 3 (OSI layer) and therefore making it possible to manage several physical entities 15, 16, 17; Ei during one and the same session).

The unit consisting of the modules 38 and 39 can be removable and therefore exchangeable in the event of development of the protocol or of the support of the internal network 12.

The module 42 represents the power supply unit consisting of batteries, a transformer and connections to the outside. This module 42 is connected to the different modules making up the device of the invention although this is not depicted in FIG. 3 for reasons of simplification.

An input/output buffer circuit 44, connected to the processing module 37, enables the man-machine interface module 14 to be connected directly to the device of the invention 10.

This man-machine interface module 14 can also be connected to the internal network. It is then connected to the module 37 through modules 39 and 38.

By virtue of the line busy detection [LBD] module 32, the device of the invention can at any time know when there is on-hooking on the line on the part of an entity or another terminal on the line, and therefore when the line is available, as illustrated in FIG. 5.

Once the connection, at the request or manifestation of a home automation entity for an outgoing call, and the communication have been established, the device of the invention "hangs up" vis-à-vis the external network and allows the exchanges on the external network to continue in a transparent manner.

By virtue of the module 33 for parallel handset off-hook detection [PROD], the device of the invention can know at any time when a "telephone" terminal 46, connected to the external network installation, has off-hooked and can therefore demand, via the internal network 12, the immediate on-hooking of the entity E1 which is currently in communication on the external network as illustrated in FIG. 7.

By virtue of the busy tone detection [BTD] module 34, during an attempted outgoing call, the device of the invention can "intelligently" manage the sequence of events: on-hooking, exchange of information with an entity in order to know whether or not it is necessary to make a new attempt, possibility of managing a time delay with a new attempt, as illustrated in FIG. 5.

By virtue of the module 35 for detecting the call waiting indication signal (440 Hz) [CWID], the device of the invention can note any time whether there is an incoming call waiting. The possible transmission of data in off-hook mode (it is a telephone terminal or an entity which is here in off-hook mode) coupled with the call waiting indication signal enables the device, which is off-hook and is "spying" on the line, to obtain information on the incoming call (nature, identity, etc), by virtue of its V23 reception modem, as illustrated in FIG. 6.

In an advantageous embodiment, the device of the invention has the following characteristics:
internal functionalities BTD, LBD, CWID, PHOD;
sub-module for access to the external network, for example: STN interface complying with current standards;
sub-module for access to the internal network (for example: CPL with EHS protocol);
function of processing data issuing from the internal network (suitable protocol);
function of processing of incoming calls (in "line on-hook" or "line off-hook" mode): management of V23 information issuing from the STN network, possibility of packeting in the protocol used on the internal network, off-hooking;
function of processing of outgoing calls: off-hooking, dialling;
function of possible storage of information necessary to the initiation of a call to the STN network;
function of possible storage of information necessary to the direct or indirect addressing of entities connected to the internal network.

The device of the invention can be self-powered (batteries, cells, light sensors, etc), remote powered (via the external network) or powered via another entity in the internal network. In addition, it can be configured and supervised via a man-machine interface either attached (as illustrated in FIG. 1) or detached (remote configuration, downloading) (connected to the internal network 12).

GLOSSARY

BTD: Busy Tone Detection
CM: Communication Module
CPL: Carrier Current on Power Line
CWID: Call Waiting Indication signal Detection
DECT: Digital European Cordless Telephone
DLMS: Distribution Line Message Specification
DTMF: Dual Tone Multi-Frequency
EHS: European Home System
EIBus: CEN TC 105 Protocol
GSM: Global System for Mobile Communications
ISDN: Integrated Services Digital Network
LBD: Line Busy Detection
MMI: Man/Machine Interface
PHOD: Parallel Handset Off-Hook Detection
PLAN: Power Line Automation Network
RAM: Random Access Memory
ROM: Read Only Memory
STI: Subscriber Terminal Installation
STN: Switched Telephone Network
V23: Recommendation V23 CCITT Blue Book: transmission by phase coherence modulation

What is claimed is:

1. An interface and switching device for communication between a subscriber terminal installation (11) of an external network and an internal network (12), to which several physical entities (15, 16, 17; Ei) are connected, comprising:
a first interface module (31) for the transmission and reception of digital data or analogue signals, connected to the said terminal installation (11);
a second interface module (38) for the transmission and reception of digital data or analogue signals, connected to the internal network (12); and a processing module (37), connected to at least one memory module (40, 41), which manages the overall operation of the said device so as to provide a function of master of the said terminal installation (11) by supervising both the state of availability of the external network and the state of the internal network from and to which requests and acknowledgements can be exchanged, said physical entities (15, 16, 17) being connected only on authorisation from this processing module (37):

directly to the external network, or via the processing module (37), this taking place after management of priorities by this processor module (37);

characterised in that it comprises:

several detection modules (32, 33, 34, 35, 36) each providing a function of detecting an action of putting in communication one of the said entities on the external network:

a first module (32) providing a line busy detection function, a second module (33) providing a function of parallel handset off-hook detection, a third module (34) providing a function of busy tone detection, and a fourth module (35) providing a function of call waiting indication detection; these detection modules communicating and exchanging data with the processing module (37);

a protocol module (39) for managing a protocol on the internal network which is associated with the second transmission-reception interface module (38), the processing module (37) being connected via input-output ports to a data exchange bus (43) for communicating with the protocol module (39); and an input-output buffer circuit (44) connected to the processing module (37) so as to permit the connection of a man-machine interface module (14).

2. A device according to claim 1, comprising a modem module (36) fulfilling a modem function, connected to the first interface module (31), to the fourth detection module (37), and making it possible to decode V23 information on an incoming call and, where necessary, to immediately off-hook and appropriate switching to one of the physical entities (15, 16, 17).

3. A device according to claim 1, wherein the processing module (37) is connected to at least one program memory module (40) and to at least one random access module (41) making it possible to store information peculiar to the internal network and information peculiar to the external network, information which may be downloaded and updated via the external network.

4. A device according to claim 1, wherein the protocol module (39) for managing the protocol on the internal network makes it possible to manage different requests issuing from the internal network in accordance with particular priorities.

5. A device according to claim 1, wherein software or physical means for managing possible conflicts between incoming calls issuing from the external network and requests to establish communication to outside.

6. A device according to claim 1, further comprising power supply means making it possible to be self-powered, remotely powered or powered via another entity in the internal network.

7. A device according to claim 1, further comprising user control means making it possible to be configured and supervised via a man-machine interface, either attached or detached.

8. A device according to claim 1, wherein the external network is the switched telephone network.

9. A device according to claim 1, wherein the external network is a network which can be taken from amongst the following networks: integrated services digital network, ATM network, xDSL network, GSM network, DECT network, DCS1800 network or UMTS network.

10. A device according to claim 1, wherein the internal network is a carrier current, twisted pair, optical fibre or radio network.

11. A device according to claim 1, wherein the protocol for access to the internal network is of the EHS, EIBus, PLAN or ITD type.

* * * * *

UNITED STATES PATENT AND TRADEMARK OFFICE
CERTIFICATE OF CORRECTION

PATENT NO. : 6,658,101 B1
DATED : December 2, 2003
INVENTOR(S) : Serge Calvez

It is certified that error appears in the above-identified patent and that said Letters Patent is hereby corrected as shown below:

Titlte page,
Item [30], Foreign Application Priority Data, please insert
-- Jul. 11, 1997 (FR) .....................97 08862 --.
Item [56], References Cited, FOREIGN PATENT DOCUMENTS, please insert
-- GB 2 194 710        3/1988 --.

Column 1,
Line 6, after Title, please insert -- DESCRIPTION --.
Line 36, please insert -- A document of the prior art, EP-A-0 639 019, describes a telephone interface circuit for a domestic data bus. This interface circuit allows communication in both direction swith electrical device connected to a data bus in order to completely manage a domestic kitchen, via a telehone line. It comprises a main controller, a signal detector connected with a telephone sound generator/detector and a sound signal recorder/reproducer having user message memories, several external memories maintaining fixed response data sent by the controller using a decoding method, and an FSK modem for coupling the said data bus to the interface circuit. --.

Column 3,
Line 59, delete "it s possible", and insert therefor -- it possible --.

Signed and Sealed this

Third Day of May, 2005

JON W. DUDAS
*Director of the United States Patent and Trademark Office*